Oct. 14, 1969   D. C. EVANS ET AL   3,472,469

VEHICLE GUIDANCE SYSTEM

Filed July 26, 1962   3 Sheets-Sheet 1

INVENTORS.
DONALD C. EVANS
BY  WILFORD L. STEINER

ATTORNEY

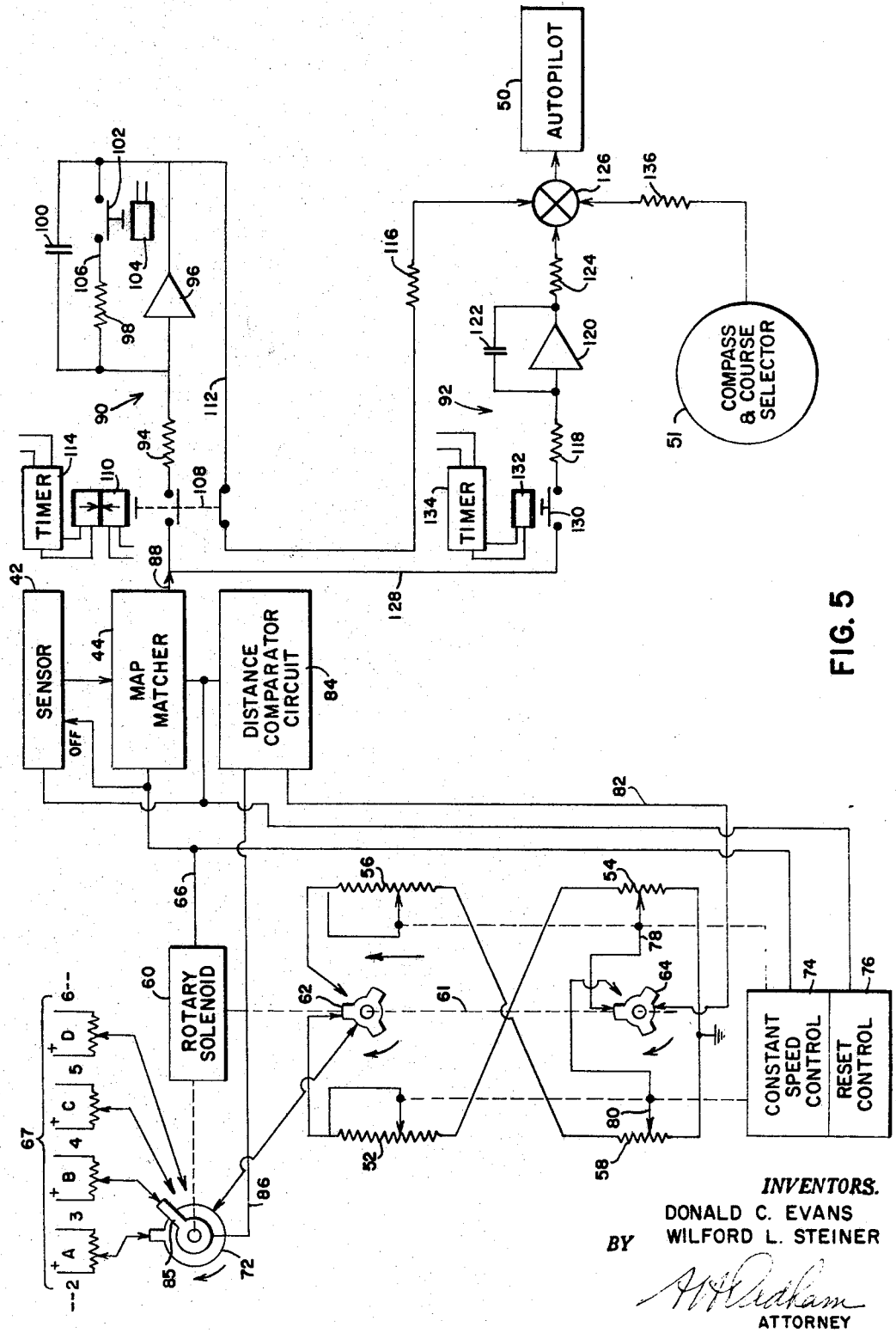

United States Patent Office 3,472,469
Patented Oct. 14, 1969

3,472,469
VEHICLE GUIDANCE SYSTEM
Donald C. Evans, Cuyahoga Falls, and Wilford L. Steiner, Akron, Ohio, assignors to Goodyear Aerospace Corporation, Akron, Ohio, a corporation of Delaware
Filed July 26, 1962, Ser. No. 214,163
Int. Cl. G06f 15/50; F42b 15/02
U.S. Cl. 244—3.15      5 Claims The present invention relates to a system for automatically guiding an aircraft or missile and more particularly to a system which automatically corrects the vehicle's position intermittently with map matching subsystems and dead-reckoning between separate map reference points.

It is the object of the present invention to provide an aircraft guidance system which intermittently corrects the aircraft lateral position and heading, and the computed longitudinal position of the aircraft.

Another object of the invention is to provide a method of automatically guiding an aircraft in flight.

Another object of the invention is to provide an aircraft guidance system that minimizes the preflight alignment and warm-up time.

Another object of the invention is to provide an aircraft guidance system with an accuracy that is substantially independent of mission range and time.

Another object of the invention is to provide an aircraft guidance system that requires a minimum amount of prior reconnaissance information or exact knowledge of the desired end point position with respect to the launch point position.

Another object of the invention is to provide an aircraft guidance system that has minimum radiation time thereby reducing enemy detection by tracking.

Another object of the invention is to provide an aircraft guidance system that is less sensitive to jamming.

Another object of the invention is to provide a self-contained ground referencing guidance system which has mid-course flight programming with limited reconnaissance coverage.

Another object of the invention is to provide a guidance system which permits end point extension to targets outside the immediate reconnaissance coverage.

According to the invention, the guidance system includes an automatic means for guiding an aircraft or missile in flight by checking its position intermittently with one of a plurality of check point reference maps and dead-reckoning between the check points. Initial inputs into the system are estimated aircraft ground velocity, estimated components of wind velocity, a series of separate reference maps which represent the check points on the aircraft's course, the aircraft's desired course, and voltages which are a function of the interval distances between the separate reference maps. The system includes a lateral control operative at the check points to measure the lateral errors in dead-reckoning and compute correction information which acts to correct the across-course position of the aircraft. A longitudinal programming means operates the sensing and map matching components of the system when the aircraft is in the area of the check point and revises the distance to go to the next check point or target.

The exact nature of the invention as well as other objects and advantages thereof will be readily apparent from the consideration of the following specification related to the annexed drawing in which:

FIG. 5 is a circuit diagram of a typical ground speed and distance computer and lateral dead-reckoning computer of the guidance system of FIG. 4.

Figure 1:
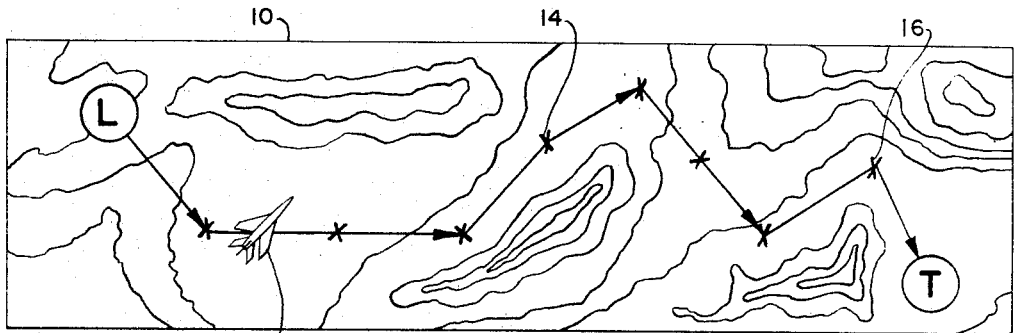
FIG. 1 shows a map containing the mission of an aircraft, established by spaced check points, having an intermittent ground-referencing guidance system.

Referring to the drawing, there is shown in FIG. 1 a map 10 having contour characteristics to indicate the terrain. The map shows the mission of aircraft 12 from the launching site L to the target T. The mission is along a flexible course in the direction of the arrows. The check points 14 are spaced along the desired course. The check points are represented by a series of separate reference maps along the flexible course obtained from previous reconnaissance flights or from simulated terrain maps. Each reference map contains reference information. The course from the last check point 16 to the target T is determined by the position of the target relative to the last check point. The aircraft is directed to the target which may be outside the immediate reconnaissance coverage of check point 16.

Figure 2:
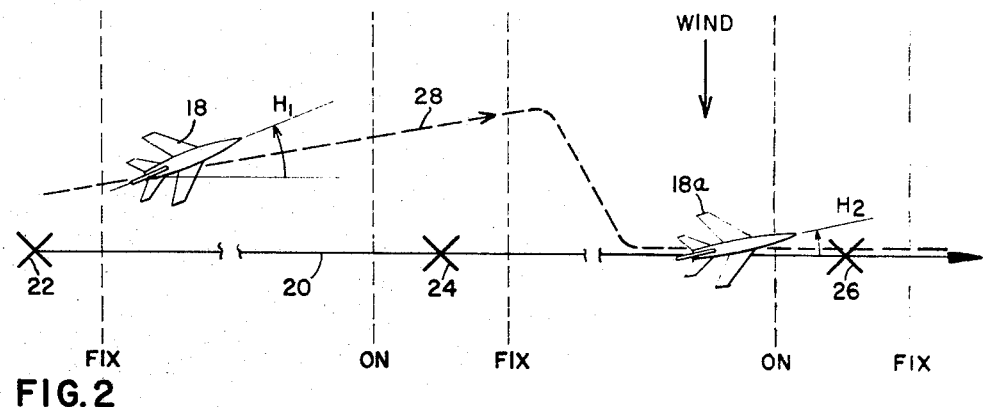
FIG. 2 is a diagram of the operating characteristics of a point-by-point map matching intermittent-ground-referencing guidance system.

Referring to FIG. 2 there is shown an aircraft 18 laterally positioned relative to a planned course 20 established by the check points 22, 24, and 26. The direction and velocity of the wind determined the heading $H_1$ with respect to the course of the aircraft 18. The flight path 28 of the aircraft 18 is laterally displaced from the planned course 20. The intermittent-ground-referencing guidance system in the aircraft 18 contains a point-by-point map matching device and a terrain sensor which is activated at a computed predetermined distance before the aircraft reaches the check point 24. The ground referencing system is operated for a limited period of time until the fix point is reached. A comparison is made between the information from the sensor and the information of the check point reference map. Output signals, which are a function of the compared information, are used to correct the lateral position of the aircraft and its computed longitudinal position. The aircraft 18a in its corrected position is provided with a new heading $H_2$ to overcome the lateral position error determined at check point 24.

Figure 3:
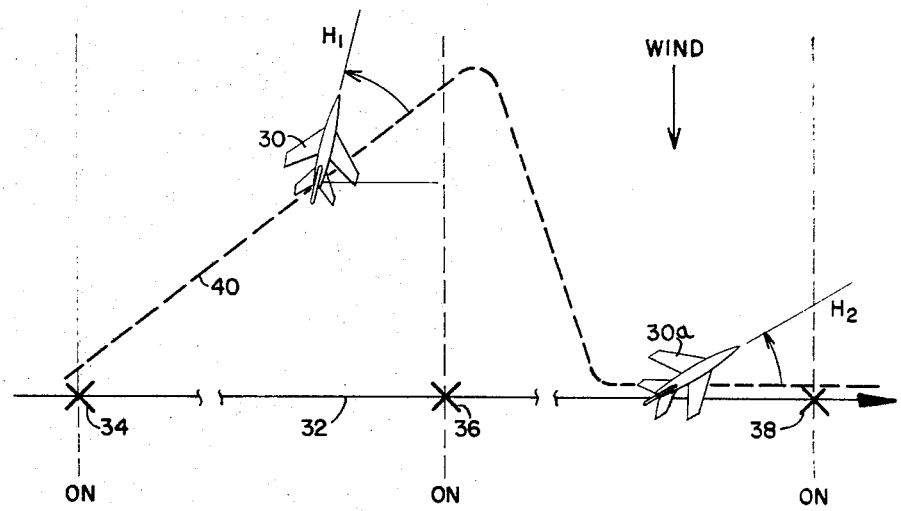
FIG. 3 is a diagram of the operating characteristics of an area map matching intermittent-ground-referencing guidance system.

There is shown in FIG. 3 a portion of the flight pattern of aircraft 30 guided along a predetermined course 32. The course 32 is established by the check points 34, 36 and 38. The aircraft 30 on the flight path 40 has a heading $H_1$ and is laterally positioned from the check point 36. The sensor sub-system carried by the aircraft 30 is programmed to be operated when the aircraft arrives at the check point as indicated by the computer. The returns from the sensing device of the system are accumulated. At a subsequent time this information is displayed without sensor radiation and matched to the reference map that corresponds to the checkpoint. The matching process and data readout may then be accomplished during the time of flight between the check points. This system reduces the required time duration of radiation at each check point by separating the radiation time from the lock-on and readout times. Furthermore, this system does not utilize a scanning sweep during matching, thus eliminating antenna scan noise which can corrupt the mismatch signals. The mismatch signals are utilized to correct the flight path of the aircraft 30, alter its heading, and correct the aircraft's computed longitudinal position.

Figure 4:
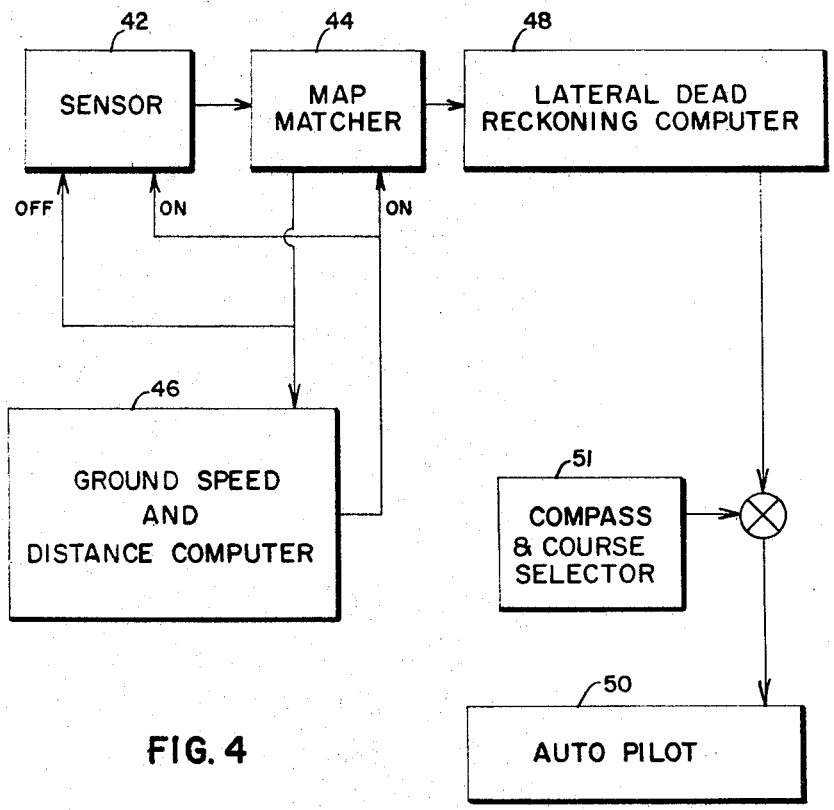
FIG. 4 is a block diagram of the intermittent-ground-referencing guidance system according to the invention.

Referring to FIG. 4 there is shown a block diagram of the intermittent-ground-referencing guidance system. A sensor 42 such as a radar, optical, or infra-red device, is operative to sense the terrain over which the aircraft is moving. The information received by the sensor 42 is converted into signals which are fed into a map matcher 44. The map matcher 44 may function as an area map matcher or a point-by-point map matcher. The map matcher compares the image representing the information from the sensor with the information of the check point reference maps. Output displacement signals are produced which are a function of the compared information. These signals are used to correct the lateral position of the aircraft or missile and to correct the distance-to-go to the next check point or target.

The intermittent-ground-referencing guidance system supplies position fix information following the brief radiation period at each check point. The position of the aircraft along the course to the next check point is computed by using stored information obtained during the previous portions of the flight. To obtain the position information needed for maintaining the flight course, the map matcher recognizes each check point in turn.

The sequence of operations of the intermittent-ground referencing guidance system is initiated by the ground speed and distance computer 46 which turns on the sensor 42 and the map matcher 44 at specific distance intervals. In the point-by-point map matching system the sensor and map matcher are activated before the aircraft reaches the check point. After the aircraft has passed the check point a fixed distance, an automatic frame limit mechanism within the map matcher turns the sensor off and activates the ground speed and distance computer. The sensor and map matcher operate simultaneously over a limited period of time to produce a signal which is proportional to the lateral displacement of the aircraft from the designated course.

In the area map matching system the sensor and map matcher are activated by the ground speed and distance computer at a time when the computed distance-to-check point reaches zero. The sensor is operated for a short period of time, in the order of one second, to obtain suitable terrain information capable of being lodged in a storage device. The storage device is used to accumulate the information. This information is subsequently compared with the information of the check point reference map to determine the displacement of the aircraft from the reference point. The comparison is made when the sensor is not operating.

During the non-radiating period dead-reckoning or inertial navigation is used to bring the system within the lock-on limits for each check point. When dead-reckoning navigation is used this is accomplished by using the computed value of the average ground speed between check points. The measured distance between check points divided by the time of flight from one check point to the next results in the average ground speed. The average ground speed measured during one non-radiating period is used to compute the longitudinal position during the following non-radiating period while concurrently making a new measurement of ground speed for use in the following interval. The errors in longitudinal position computations are not cumulative because at each check point the distance and ground speed computers are zeroed.

The lateral dead-reckoning computer 48 receives the lateral position information from the map matcher 44 and computes and creates necessary course correction in conjunction with the auto pilot 50. The signals from the lateral dead-reckoning computer are programmed into the auto pilot after each check point to correct the lateral position of the aircraft.

The computer 48 contains a cross-wind compensator which produces output signals which are added to the position correction signals within the lateral dead-reckoning computer. These signals are then added to course reference information from the compass and course selector 51. The cross-wind compensator functions to correct the minor heading errors due to a change in the average cross wind and permits the system to hold successive compass courses on a given mission. The heading of the aircraft is varied as a function of the integrated lateral position error which is a measure of the cross-wind effects. The output of the cross-wind compensator is cumulative from interval to interval and produces a heading change resulting in a lateral velocity correction.

As shown in FIG. 5, the longitudinal programming of the guidance system is obtained by a pair of dual potentiometers 52, 58 and 56, 54. Each set of potentiometers are operated alternately during successive intervals between adjacent check points by a rotary solenoid 60 having a drive shaft 61 operating a pair of stepping switches 62 and 64. The switch 62 alternately programs preset voltages into the dual potentiometers. The stepping switches 62 and 64 are actuated by the rotary solenoid 60 energized with signals carried by conductor 66 from the map matcher 44.

Different voltages are programmed into the switch 62 to accommodate unequal spacing between the check points. The input voltage represents a predetermined distance over which the ground speed of the aircraft is averaged. Manually adjustable potentiometers 67 are used to separate the individual input voltages. A distributor 72 sequentially operated by the rotary solenoid 60 separately connects the respective manually adjustable potentiometers 67 to the switch 62.

A constant speed motor 74 having a reset control 76 is alternately connected to the dual potentiometers 52, 58 or 54, 56. The motor is operated to alternately and uniformly change the potentiometer resistances from the time the aircraft leaves one check point until the time it arrives at the next. Assume, for example, as seen in FIGURE 5, that the aircraft had just passed checkpoint 3 and was heading for checkpoint 4, a distance represented by potentiometer B of the adjustable potentiometers 67. In other words, potentiometer B represents the present distance between the checkpoints which the aircraft is now traversing while potentiometer A represents, as a voltage, the distance between checkpoints 2 and 3 or the previous distance over which the aircraft has just flown. Now in the set up illustrated in FIGURE 5, potentiometer 52 would have been set on the previous computation in accordance with the distance between checkpoints 2 and 3, and so now when the voltage representing this distance is impressed through distributor 72 and switch 62 thereon the current therefrom represents the average speed of the aircraft over the previous distance between checkpoints 2 and 3. This current is then fed to potentiometer 54 because of the electrical cross connection. Therefore, with the arms 78 of potentiometer 54 moved from a full downwardly position upwardly at a constant rate the voltage picked off by arm 78 represents the distance traveled by the aircraft based on the average speed between the previous checkpoints 2 and 3.

The arm 78 contacts stepping switch 64. A conductor 82 connects the switch 64 with a distance comparator circuit 84. The circuit 84 compares the input voltage from the appropriate potentiometer 67, via distributor 85 and conductor 86 (i.e., potentiometer B as defined above corresponding to the distance between the present check points) with the voltage in conductor 82 (corresponding to the distance traveled by the aircraft). When these voltages are substantially equivalent circuit 84 operates to energize the sensor 42 and map matcher 44. Simultaneously, this signal from the circuit 84 in conductor 86 operates the reset control 76 to move the stationary potentiometer 52 back to its starting position, which is fully downward as shown in FIGURE 5. In the next cycle or measurement, then, potentiometer 56 which has remained stationary after the previous cycle has voltage representing the distance 3 to 4 impressed thereon by proper rotation of switches 62 and 72 so that a current representing average ground speed between checkpoints 3 and 4 is sent to potentiometer 58. Thus, it is seen how the cycle is repetitive with alternating drive of the dual potentiometers 52, 58 and 54, 56.

The signals from the map matcher 44 turn the sensor off and operate the constant speed motor 74 to drive the dual potentiometer 52, 58 during the succeeding interval.

When using the point-by-point map matcher the lateral control is effected by feeding with conductor 88 the lateral output signals from the map matcher 44 into a memory circuit 90 and for a few seconds into a cross-wind integrator circuit 92. These circuits program signals to the auto pilot 50 at each check point to correct both the lateral position and the heading of the aircraft.

The memory circuit 90 contains a first resistor 94 connected in series with an amplifier 96. The amplifier is shunted by a second resistor 98 and a capacitor 100. The resistor 98 and capacitor 100 are connected in parallel. A switch 102 operated by a relay 104 opens the second resistor line 106. The relay closes the switch 102 only when the sensor 42 and map matcher 44 are operating.

A double acting switch 108 controlled by a differential relay 110 controls the signals that enter and leave the circuit 90. The switch 108 connects the input conductor 88 with the circuit 90 when the sensor 42 is operating. When the input conductor switch is closed the switch in the output conductor 112 is open. The input signals from the map matcher charge the capacitor 100 and are stored therein.

The memory circuit 90 applies the course correction signal through conductor 112 and resistor 116 to the auto pilot 50 for a specific period of time, such as five minutes, after each check point to return the aircraft to the desired course. The time period is sufficiently long to make the course change occur over a long distance so as to minimize the alteration of the longitudinal component of the true course ground speed. At the end of the time period conductor 112 is opened by switch 108. The circuit 90 remains inactive until the next check point is reached. From the termination of the course correction time period until the next check point is reached no turn signals are fed into the auto pilot by circuit 90.

The cross-wind integrator circuit 92 contains a resistor 118 connected in series with an amplifier 120. The amplifier is shunted with a capacitor 122. The amplifier and capacitor output signals pass through a resistor 124 into a summation junction 126 for the auto pilot 50. A conductor 128 and switch 130 connects the conductor 88 with the circuit 92. A relay 132 controlled by a timer 134 is operable at each check point to close the switch 130 for a duration of about five seconds. The amplifier 120 and capacitor 122 integrates and stores the lateral error signal during the five second period. The capacitor output signal represents the drift correction needed to fly the course to the next check point without an additional lateral error. This signal is always applied to the auto pilot and is cumulative from interval to interval, and produces a heading change resulting in lateral velocity correction.

The compass and course selector 51 provides the auto pilot with aircraft heading information.

When an area map matcher is used, the sequencing of the operation of the circuits 90 and 92 by the switches would be altered in accordance to the requirements of the system shown in FIG. 3.

What is claimed is:

1. An automatic guidance system for controlling an aircraft in flight in accordance with spaced check point reference map information comprising sensor means for recognizing the terrain characteristics and converting said characteristics into instantaneous present map information, a map matcher connected to the sensor means to receive the map information including
means to compare the map information with the reference map information and to produce lateral error output signals which are a function of the compared information, lateral position computer means connected to the map matcher to receive the lateral error output signals and operable to compute and create lateral position and heading correction signals for directing the aircraft toward the next successive spaced check point, an auto pilot connected to the lateral position computer means receiving the correction signals therefrom to guide the aircraft to the next successive spaced check point, and compass means providing the auto pilot with selected heading information, and longitudinal computer means for sequentially energizing the sensor means and map matcher for a limited period of time as the aircraft passes over each successive check points.

2. An automatic guidance system for controlling an aircraft in flight in accordance with spaced check point reference map information comprising sensor means for recognizing the terrain characteristics and converting said characteristics into map information, a map matcher connected to the sensor means to receive the map information,
means to compare the map information with the reference map information and to produce lateral error output signals which are a function of the compared information, and
means to advance the reference map information sequentially after the comparison has been completed, lateral position computer means connected to the map matcher to receive the lateral error output signals and operable to compute and create lateral position and heading correction signals comprising
a memory circuit containing an amplifier shunted by a resistor and capacitor connected in parallel, a first switch operable to isolate the resistor, a second switch operable to control the signals as they enter and leave the memory circuit, and a timing means controlling the action of said second switch, and
a cross-wind integrator circuit connected in parallel with the memory circuit containing an amplifier shunted with a capacitor, and a time controlled switch operable to regulate the signals into the integrator circuit, an auto pilot connected to the lateral position computer means for receiving the correction signals therefrom to control the lateral position and heading of the aircraft, and longitudinal computer means for sequentially energizing the sensor means and map matcher for a limited period of time as the aircraft passes over the respective check points,
said longitudinal computer means being controlled by the map matcher and distance comparator circuit, said longitudinal computer means comprising
a pair of dual potentiometers,
stepping switch means operative to alternately program preset voltages into the potentiometers during successive intervals between adjacent check points,
a constant speed motor means having a reset control operatively connected to the potentiometers to alternately and uniformly change the resistance thereof from the time the aircraft leaves one check point until it arrives at the next check point, and
a comparator switch circuit operable to compare the voltage at the potentiometer output with a preset voltage corresponding to the distance between the immediate check points.

3. In an automatic guidance system for controlling an aircraft in flight in accordance with spaced point reference map information, sensor means for recognizing the terrain characteristics and converting said characteristics into position map information, a map matcher connected to the sensor means to receive the position map information and compare it with the reference map information, including
means responsive to the compared information to produce lateral correction output signals, lateral computer means responsive to the lateral displacement output signals to compute and create lateral position and heading correction signals to direct the aircraft toward the next successive check point, and longitudinal computer means for sequentially energizing the sensor means and map matcher for a limited period of time as the aircraft passes over the respective check points.

4. An automatic guidance system for controlling an aircraft in flight in accordance with spaced check point reference map information comprising sensor means for recognizing the terrain characteristics and converting said characteristics into map information, a map matcher connected to the sensor means to receive and compare the map information to the reference map information for a respective check point to produce an error signal, a lateral position computer means connected to the map matcher to receive the error signal and operable to compute and create lateral position and heading correction signals, an auto pilot connected to the lateral position computer means for receiving the correction signals therefrom to control the lateral position and heading of the aircraft, a distance comparator circuit receiving aircraft distance traveled information and distance between successive check points information as inputs to determine when the aircraft is passing over each successive respective check point, and longitudinal computer means for sequentially energizing the sensor means and map matcher for a limited period of time upon actuation by the distance comparator circuit as the aircraft passes over the successive respective check points.

5. An automatic guidance system for controlling an aircraft in flight in accordance with pre-determined spaced check point reference map information which comprises, means for recognizing terrain characteristics and converting said characteristics into present map information, means to compare said present map information with said reference map information for a respective spaced check point to produce lateral error output signals which are a function of the compared information, means to advance the reference map information to the next successive spaced check point after said comparison has been completed, means to receive the lateral error output signals to create lateral position and heading correction signals, means receiving the lateral position and heading correction signals to control the lateral position and heading of the aircraft, and means for sequentially energizing the terrain recognizing means and the comparator means for a limited period of time as the aircraft passes over the respective check points, said means comprising means to alternately program and store pre-set voltages during successive intervals between adjacent check points representing the actual pre-determined distance between adjacent check points, means to alternately and uniformly change a resistance from the time the aircraft actually leaves one check point until it arrives at the next adjacent check point to produce a final voltage output, and means operable to compare the final voltage output with the pre-set voltage.

References Cited

UNITED STATES PATENTS

| | | | |
|---|---|---|---|
| 2,679,636 | 5/1954 | Hillyer | 343—5 |
| 2,680,808 | 6/1954 | Nolde | 320—1 |
| 2,847,855 | 8/1958 | Berger | 244—14.4 |
| 2,896,198 | 7/1959 | Bennett | 318—28.53 |
| 2,996,250 | 8/1961 | Schenkerman | 318—28 |
| 3,071,765 | 1/1963 | Schutz | 244—14 |
| 3,054,999 | 9/1962 | Forbath et al. | 343—5 |

BENJAMIN A. BORCHELT, Primary Examiner

T. H. WEBB, Assistant Examiner

U.S. Cl. X.R.

244—77; 343—7